US009659045B2

(12) United States Patent
Liu et al.

(10) Patent No.: US 9,659,045 B2
(45) Date of Patent: May 23, 2017

(54) GENERIC INDEXING FOR EFFICIENTLY SUPPORTING AD-HOC QUERY OVER HIERARCHICALLY MARKED-UP DATA

(71) Applicant: Oracle International Corporation, Redwood Shores, CA (US)

(72) Inventors: Zhen Hua Liu, San Mateo, CA (US); Beda Hammerschmidt, Los Gatos, CA (US); Douglas McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 14/498,893

(22) Filed: Sep. 26, 2014

(65) Prior Publication Data

US 2015/0134670 A1    May 14, 2015

Related U.S. Application Data

(60) Provisional application No. 61/901,558, filed on Nov. 8, 2013.

(51) Int. Cl.
*G06F 17/30* (2006.01)

(52) U.S. Cl.
CPC .. *G06F 17/30327* (2013.01); *G06F 17/30286* (2013.01)

(58) Field of Classification Search
None
See application file for complete search history.

(56) References Cited

U.S. PATENT DOCUMENTS

| 6,233,575 | B1 | 5/2001 | Agrawal et al. |
| 2005/0055334 | A1 | 3/2005 | Krishnamurthy |
| 2005/0268171 | A1 | 12/2005 | House et al. |
| 2012/0221604 | A1* | 8/2012 | Gao ................... G06F 17/30938 707/797 |
| 2014/0095519 | A1* | 4/2014 | Liu ................... G06F 17/30938 707/755 |

* cited by examiner

*Primary Examiner* — Wilson Lee
(74) *Attorney, Agent, or Firm* — Hickman Palermo Becker Bingham LLP

(57) ABSTRACT

Hierarchical data objects are indexed using an index referred to herein as a hierarchy-value index. A hierarchy-value index has, as index keys, tokens (tag name, a word in node string value) that are extracted from hierarchical data objects. Each token is mapped to the locations that correspond to the data for the token in hierarchical data objects. A token can represent a non-leaf node, such as an XML element or a JSON field. A location can be a region covering and subsuming child nodes. For a token that represents a non-leaf node, a location to which the token is mapped contains the location of any token corresponding to a descendant node of the non-leaf node. Thus, token containment based on the locations of tokens within a hierarchical data object may be used to determine containment relationships between nodes in a hierarchical data object.

30 Claims, 7 Drawing Sheets

202

Create table JTAB(jid number, jobj varchar); –" jobj stores JSON objects in text"

204

Create INDEX JIDX HVAL on JTAB (jobj);

206 insert into JTAB(1, '{"name": "John Smith", "birthdate": '1998-09-09',
　　　　　　　　"friends" : [
　　　　　　　　　　　　{"name": "Helen Yan", "birthdate":'1996-09-10'},
　　　　　　　　　　　　{"name": "Helen Guang Hwang", "birthdate":'1986-06-10'}
　　　　　　　　　　　　]
　　　　　　}');

208 insert into JTAB(2, '{"name": "Helen Drake", "birthdate": '1998-09-09',
　　　　　　}');

FIG. 2

JSON Object 1

{ "name":"John Smith",

"birthdate": '1998-09-09',

"friends" : [

{"name": "Helen Yan", "birthdate":'1996-09-10'},

{"name": "Helen Guang Hwang", "birthdate":'1986-06-10'}

Hierarchy-Value Index 401

Keyword Index 402

| Token | Type | PostingList |
|---|---|---|
| name | tagname | (1,((2-4), (10-12), (16, 19)) (2,((2-4))) |
| birthdate | tagname | (1,((5-6), (13-14), (20-21))) (2,((5-6))) |
| friends | tagname | (1, ((7-21))) |
| JOHN | keyword | (1, (3)) |
| SMITH | keyword | (1, (4)) |
| HELEN | keyword | (1,(11, 17)) (2, (3)) |
| YAN | keyword | (1, (12)) |
| GUANG | keyword | (1,(18)) |
| HWANG | keyword | (1,(19)) |
| DRAKE | keyword | (2, (4)) |

Date Range Index 404

| Range | PostingList |
|---|---|
| 1980-01-01 to 1990-01-01 | (1,(21,1986-06-10)) |
| 1990-01-01 to 2000-01-01 | (1,(1996-09-10,14)) (1, (1998-09-09, 6)) (2, (1998-09-09,6)) |

FIG. 4

Parsing Event Table 500

| | Parser Event/Extracted Token | Token Locations |
|---|---|---|
| 501- | Begin Obj | 1 -21 |
| 502 - | Field: "name" | 2-4 |
| 503 - | String Value: 'John Smith' | 3,4 |
| | Field: "birthdate" | 5-6 |
| | Date Value: 1998-09-09 | 6 |
| | Begin Field: "friends" | 7 - 21 |
| | Begin Array | 8 - 21 |
| | Begin Obj | 9 -15 |
| | Field: "name" | 10 -12 |
| | String Value: 'Helen Yan' | 11, 12 |
| | Field: "birthdate" | 13 -14 |
| | Date Value: 1996-09-10 | 14 |
| | End Obj | |
| | Begin Obj | 15 -21 |
| | Field: "name" | 16 -19 |
| | String Value: 'Helen Guang Hwang' | 17,18,19 |
| | Field: "birthdate" | 20-21 |
| | Date Value: 1986-06-10 | 21 |
| | End Obj | |
| | End Array | |
| | End Field | |
| 555 - | End Obj | |

FIG. 5

GENERIC INDEXING FOR EFFICIENTLY SUPPORTING AD-HOC QUERY OVER HIERARCHICALLY MARKED-UP DATA

RELATED APPLICATIONS

The present application claims priority to U.S. Provisional Application 61/901,558, entitled "Generic Indexing Technique Of Efficiently Supporting Ad-Hoc Query Over Hierarchical Semi-Structured Data", filed on Nov. 8, 2013 by Zhen Liu, et al., the contents of which are incorporated herein by reference.

FIELD OF THE INVENTION

Embodiments of the present invention relate to querying hierarchically marked-up data.

BACKGROUND

The use of hierarchical mark-up languages for structuring and describing data has found wide acceptance in the computer industry. An example of a mark-up language is the Extensible Mark-up Language (XML). Another example is JavaScript Object Notation (JSON).

Data structured using a hierarchical mark-up language is composed of nodes. Nodes are delimited by a set of delimiters that mark the nodes, and may be tagged with names, referred to herein as tag names. In general, the syntax of hierarchical mark-up languages specify that tag names are embedded, juxtaposed, or otherwise syntactically associated with delimiters that delimit nodes. There may be two kinds of nodes, leaf nodes and non-leaf nodes.

XML

For XML data, a node is delimited by start and end tags that comprise tag names. For example, in the following XML fragment,

```
<ZIPCODE>
    <CODE>95125</CODE>
    <CITY>SAN JOSE</CITY>
    <STATE>CA</STATE>
</ZIPCODE>
``` the start tag <ZIP CODE> and the end tag </ZIP CODE> delimit a node having the name ZIP CODE.

FIG. 1A is a node tree representing the above XML fragment. Referring to FIG. 1A, it depicts node tree 101. Non-leaf nodes are depicted with double-line borders, while leaf nodes are depicted with single-line borders. In XML, a non-leaf node corresponds to an element node and a leaf node corresponds to a data node. The element nodes in the node tree are referred to herein by the node's name, which is the name of the element represented by a node. For convenience of exposition, the data nodes are referred to by the value the data nodes represent.

The data between the corresponding tags is referred to as a node's content. For a data node, the content can be a scalar value (e.g. integer, text string, date).

A non-leaf node, such as an element node, contains or more other nodes. For an element node, the content can be a data node and/or one or more element nodes.

ZIPCODE is an element node that contains child nodes CODE, CITY, and STATE, which are also element nodes. Data nodes 95125, SAN JOSE, and CA are data nodes for element nodes CODE, CITY, and STATE, respectively.

The nodes contained by a particular node are referred to herein as descendant nodes of the particular node. CODE, CITY, and STATE are descendant nodes of ZIPCODE. 95125 is a descendant node of CODE and ZIPCODE, SAN JOSE is a descendant node of CITY and ZIPCODE, and CA is a descendant node of STATE and ZIPCODE.

A non-leaf node thus forms a hierarchy of nodes with multiple levels, the non-leaf node being at the top level. A node at each level is linked to one or more nodes at a different level. Any given node at a level below the top level is a child node of a parent node at the level immediately above the given node. Nodes having the same parent are sibling nodes. A parent node may have multiple child nodes. A node that has no parent node linked to it is a root node. A node that has no child nodes is a leaf node. A node that has one or more descendant nodes is a non-leaf node.

For example, in non-leaf node ZIP CODE, node ZIP CODE is a root node at the top level. Nodes 95125, SAN JOSE, and CA are leaf nodes.

The term "hierarchical data object" is used herein to refer to a sequence of one or nodes, at least one of the nodes in the sequence being a non-leaf node having a child node An XML document is an example of a hierarchical data object. Another example is a JSON object.

JSON

JSON is a lightweight hierarchical mark-up language. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "{ }" and separated within the braces by commas.

An array, which is a list of comma separated JSON values enclosed in square brackets "[ ]".

An atom, which is a string, number, true, false, or null.

The following JSON object J is used to illustrate JSON.

```
{
    "FIRSTNAME": "JACK",
    "LASTNAME": "SMITH",
    "ADDRESS": {
        "STREETADDRESS": "101 FIRST STREET",
        "CITY": "SAN JOSE",
        "STATE": "CA",
        "POSTALCODE": "95110"
    },
    "PHONENUMBERS": [
        "408 555-1234",
        "650 123-5555"
    ]
}
```

Object J contains fields FIRSTNAME, LASTNAME, ADDRESS, STREETADDRESS, CITY, STATE, POSTALCODE, and PHONENUMBERS. FIRSTNAME and LASTNAME have atom string values "JOHN" and "SMITH", respectively. ADDRESS is an object containing member fields STREETADDRESS, CITY, STATE, and POSTALCODE, which have atom string values "101 FIRST STREET", "SAN JOSE", "CA", "95110", respectively. PHONENUMBERS is an array comprising atom values "408 555-1234" and "650 123-5555".

Each field in a JSON object is a non-leaf node and the name of the non-leaf node is the field name. Each array and object is a non-leaf node. Data nodes correspond to an atom value.

FIG. 1B depicts JSON object J as hierarchical data object 101 comprising nodes as described below. Referring to FIG. 1B, there are four root nodes, which are FIRSTNAME, LASTNAME, ADDRESS, and PHONENUMBERS. Each of FIRSTNAME, LASTNAME, ADDRESS, and PHONENUMBERS is a field node. ADDRESS has a descendant object node. From the object node four descendant field nodes descend, which are STREETADDRESS, LASTNAME, STATE, and POSTALCODE.

Nodes FIRSTNAME, LASTNAME, STREETADDRESS, CITY, STATE, and POSTALCODE have descendant data nodes representing atom string values "JACK", "SMITH", "101 FIRST STREET", "SAN JOSE", "CA", "95110", respectively.

PHONENUMBERS has a descendant array node. The array node has two descendant data nodes representing atom string values "408-555-1234", and "650-123-555".

Schemas-Based Approaches

Efficient querying is critically important to accessing hierarchical data objects. Effective approaches for querying hierarchical data objects include schema-based approaches.

One schema-based approach is the schema-based relational-storage approach. In this approach, collections of hierarchical data objects ("collection members") are stored as schema instances within tables of a database managed by a Database Management System (DBMS). This approach leverages the power of object-relational DBMS's to index and query data. In general, the schema-based relational-storage approach involves registering a schema with a DBMS, which generates tables and columns needed to store the attributes (e.g. elements, fields) defined by the schema.

Storing a collection of hierarchically marked-up documents or objects as instances of a schema may require developing a schema that defines many if not all attributes found in any member of a collection. Some or many of the attributes defined by the schema may only occur in a relatively small subset of the collection members. The number of attributes defined by a schema may be many times larger than the number of attributes of many collection members. Many attributes may be sparsely populated. Managing schemas with a relatively large number of attributes, some or many of which may be sparsely populated, can be burdensome to a DBMS and administrators and users of the DBMS.

Schema-Less Approaches

To avoid pitfalls of using schema-based approaches, schema-less approaches may be used. One schema-less approach is the partial projection approach. Under the partial projection approach, a set of commonly queried attributes of the collection are projected and copied into columns of additional tables; these tables exist to support DBMS indexing of the columns using, for example, binary tree or bit map indexing. The approach works most optimally when the query workload for the collection is known to follow a pattern, so that commonly queried attributes can be determined. The approach works less optimally when the workload is ad-hoc and the number of attributes to project cannot be easily restrained to a relatively small number. Also, many of the unprojected attributes must be searched using text search or functional evaluation against collection members.

Another schema-less approach is the inverted index approach. An inverted index is used to index values of a collection. The inverted index approach provides efficient ad-hoc querying based on key words.

Querying Based on Structural Features

When querying hierarchically marked-up data, it is important to be able to specify structural features of the data to return. Structural features of hierarchically marked-up data include element containment, field containment, and path-based and hierarchical relationships among nodes in hierarchically marked-up data. In general, schema-based approaches provide more efficient ad hoc querying based on structural features.

Described herein is a schema-less indexing approach for efficiently querying hierarchically marked-up data based on structural features of the hierarchically marked-up data.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

In the drawings:

FIG. 2 illustrates database language statements used to create a database table for JSON objects and to insert JSON objects within the database table according to an embodiment of the present invention.

FIG. 3 illustrates tokens generated for a JSON object according to an embodiment of the present invention.

FIG. 4 illustrates a hierarchy-value index according to an embodiment of the present invention.

FIG. 5 illustrates parsing events used to generate tokens to index in a hierarchy-value index according to an embodiment of the present invention.

DESCRIPTION OF EXAMPLE EMBODIMENTS

Figure 1A:
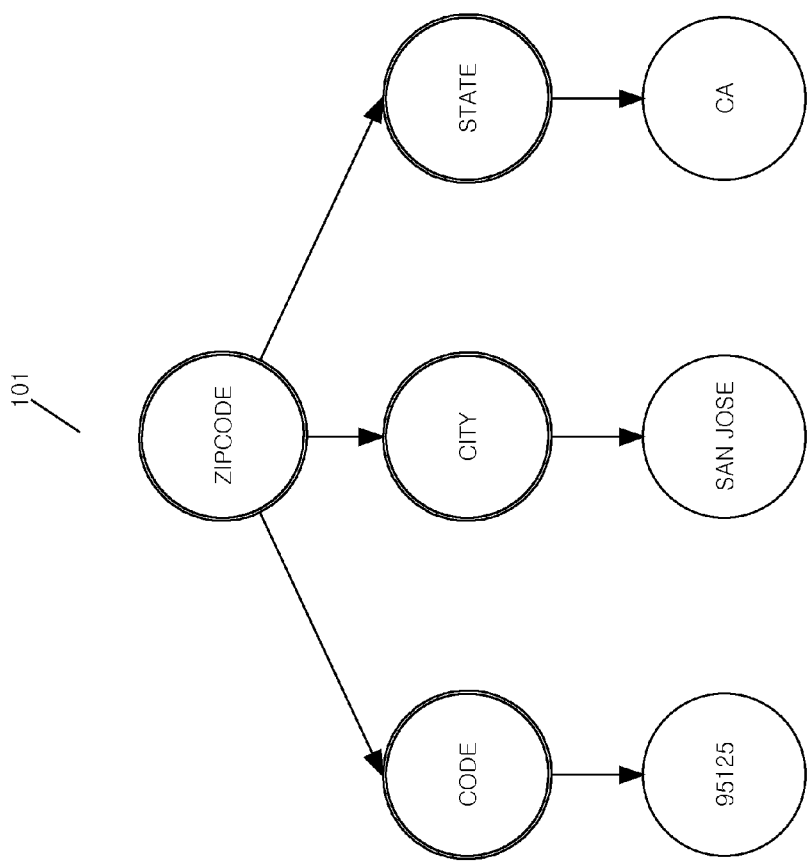
FIG. 1A illustrates XML data as a hierarchical data object comprising nodes according to an embodiment of the present invention.
Figure 1B:
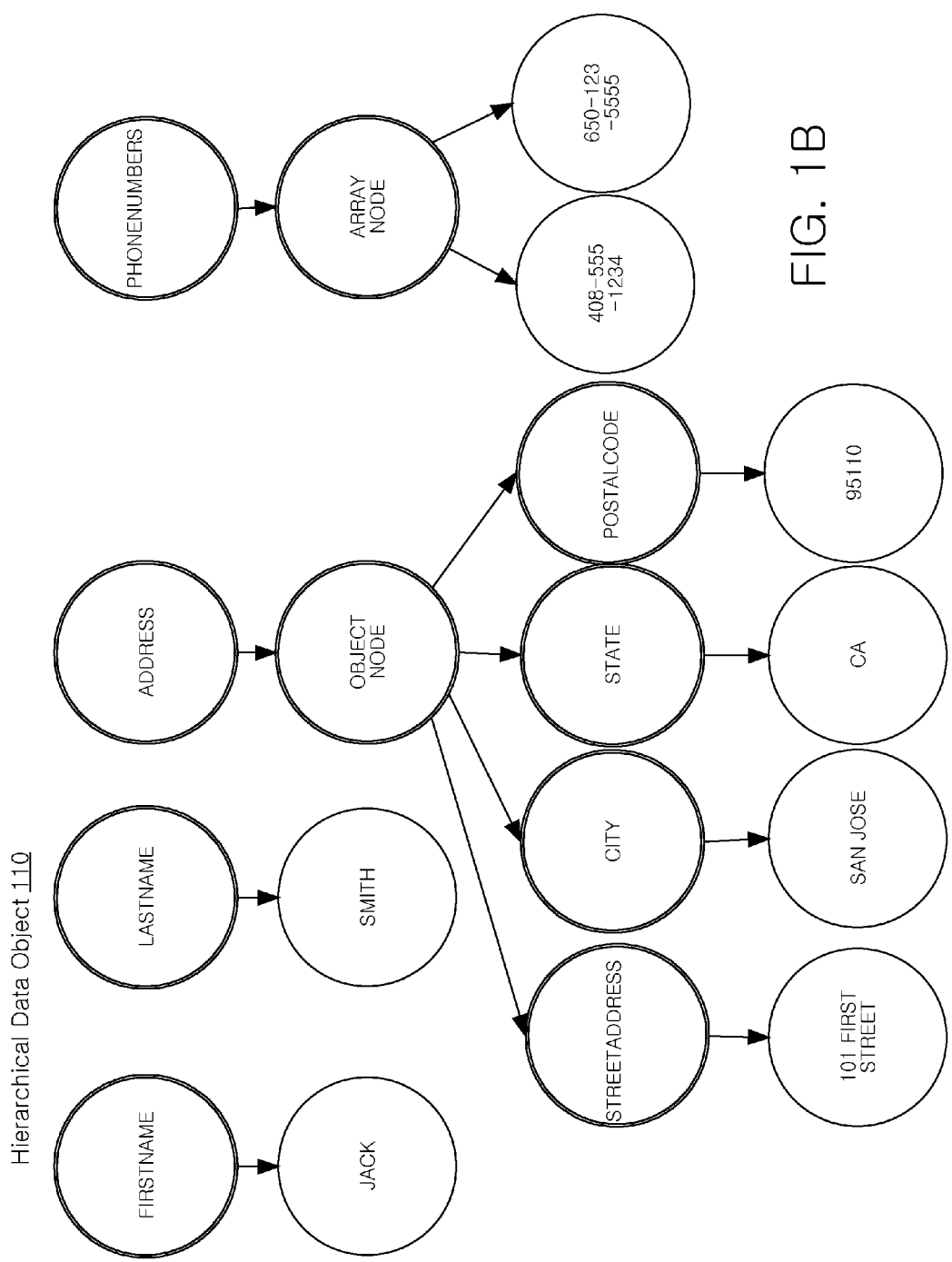
FIG. 1B illustrates a JSON object as a hierarchical data object comprising nodes according to an embodiment of the present invention.

In the following description, for the purposes of explanation, numerous specific details are set forth in order to provide a thorough understanding of the present invention. It will be apparent, however, that an embodiment of the present invention may be practiced without these specific details. In other instances, structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

Described herein are approaches for indexing hierarchical data objects that enable efficient querying based on structural features of the hierarchical data object. Hierarchical data objects are indexed using an index referred to herein as a hierarchy-value index. A hierarchy-value index has, as index keys, tokens that are extracted from hierarchical data objects. A token may be, among other things, a tag name, a word in the string value of a data node, or the value of the data node. Each token is mapped to the locations that correspond to the data for the token in one or more hierarchical data objects.

A token can represent a non-leaf node, such as an XML element or a JSON field. A location can be a region covering and subsuming one or more child nodes of the non-leaf node. For a token that represents a non-leaf node, a location to which the token is mapped contains the location of any token corresponding to a descendant node of the non-leaf node. Thus, token containment based on the locations of tokens within a hierarchical data object may be used to determine containment relationships between nodes in a hierarchical data object. The containment relationships may be used to evaluate, efficiently and at least partially, hierarchical relationships and other structural features specified in queries on hierarchical data objects.

Use of a hierarchy-value index to query hierarchical data objects does not require schemas of the hierarchical data objects indexed by the hierarchy-value index. Thus, efficient querying of hierarchical data objects is enabled by a hierarchy-value index without need of a schema describing the hierarchical data objects.

Approaches based on hierarchy-value indexes described herein are explained not only in terms of the model for hierarchical data objects that contain non-leaf and leaf nodes that is described previously, but are also illustrated using JSON. Those skilled in the art may apply the approaches described herein, as described herein, to other hierarchical data objects written in other hierarchical mark-up languages, such as XML.

Illustrative Hierarchical Data Objects

FIG. 2 illustrates DDL ("data definition language") and DML ("data manipulation language") statements used to create and populate database structures for JSON objects. These data structures and JSON objects are used to illustrate embodiments of the present invention.

Referring to FIG. 2, it depicts DDL statement 202, which when submitted to a DBMS causes the DBMS to create a table JTAB, having columns JID and JOBJ. A row in JTAB stores a JSON object. The data type of JID is a number; each row in JTAB holds a unique number in JID to identify the JSON object stored in the row.

DDL statement 204, when submitted to a DBMS, causes the DBMS to create and maintain a hierarchy-value index for column JOBJ. As JSON objects are inserted into table JTAB, the hierarchy-value index is updated to reflect the JSON objects.

DML statement 206 and DML statement 208 are insert statements that when submitted to a DBMS, cause the DBMS to store JSON objects specified in the statement. DML statement 206 inserts a JSON object identified by 1; the JSON object is referred to herein as JSON object 1. DML statement 208 inserts a JSON object identified by 2; the JSON object is referred to herein as JSON object 2.

Illustrative Tokens of a Hierarchy-Value Index

A hierarchy-value index may be a composite index that comprises multiple indexes. According to an embodiment of the present invention, a hierarchy-value index comprises a key word index and may comprise one or more range indexes. A range index is described in another section below.

A key word index comprises tokens extracted from hierarchical data objects. A token may be a tag name of a non-leaf node, a word in a data node, or another value in a data node, a delimiter, or another feature of a hierarchical data object. Forming a key word index entails parsing and/or extracting tokens from hierarchical data objects. Not all tokens found in a hierarchical data object are necessarily indexed by a key word index.

In general, a key word index indexes tokens that are tag names or words in string value data nodes. The key word index indexes each token to one or more hierarchical data objects that contain the token, and to the sequence of characters in those hierarchical data objects that cover the content of the token.

For JSON, a token may be:
1) The beginning of an object or array.
2) A field name.
3) An atom value, in the case of a non-string JSON value.
4) A word in a string atom value.

The order of the token is represented by an ordinal number that is referred to herein as a token number. Tokens that correspond to a field name or a word in a string atom value are used to form key values for a key word index. Each index entry in a key word index maps a token to a token location, which may be a token number or a token range defined by, for example, a beginning token number and end token number.

A token that corresponds to a tag name of a non-leaf node is referred to herein as a tag name token. With respect to JSON, a tag name is a field name and a token that corresponds to a field name is a tag name token but may also be referred to herein as a field token.

A token range specifies, in terms of token numbers of tokens, the region in a JSON object corresponding to the field node and the content of the field node.

FIG. 3 depicts the tokens in JSON object 1. Each call out label in FIG. 3 refers to a token in JSON object 1 by token number. Token #1 is the beginning of the JSON object. Token #2 is a field name "name". Token #3 is the first word in the atom string value of field "name". Token #4 is the second word in the atom string value of field "name". Token #7 corresponds to a field token "friends". Token #8 is a delimiter that corresponds to the beginning of the array that is the JSON value for field "friends". Token #9 and token #15 are each a delimiter that corresponds to the beginning of an object within the array.

A token that is a word in a string value of a data node is referred to herein as word token. Token #3 is a word token. A token that corresponds to a non-string value of a data node is referred to herein as a value token. Token #14 and token #21 are value tokens representing date values.

Illustrative Hierarchy-Value Index.

FIG. 4 depicts hierarchy-value index 401, a hierarchy-value index according to an embodiment of the present invention. Hierarchy-value index 401 is a composite index comprising Key Word Index 402 and Date Range Index 404.

Key Word Index 402 is a table that indexes tokens as described above, and comprises column Token, Type, and PostingList. Column Token contains tokens corresponding to field tokens and word tokens found in JSON objects. Column Type contains token type, which may be "tagname" to designate tokens that are field tokens and may be "keyword" to designate tokens that are word tokens.

Column PostingList contains posting lists. A posting list comprises one or more references to a hierarchical data object, the references being referred to herein as object references. An object reference contains an identifier that identifies a hierarchical data object, and one or more token locations, as is illustrated below.

Each entry in Key Word Index 402 maps a token to a posting list, thereby mapping the token to each JSON object that contains the token and to the location in the object corresponding to the token. The depiction of Key Word Index 402 in FIG. 4 shows the entries generated for JSON object 1 and JSON object 2.

Referring to FIG. 4, Key Word Index 402 contains an entry for "name". Because the entry contains "tagname" in column Type, the entry maps the token "name" as a field token to JSON objects and token locations specified in posting list ((1,(2-4), (10-12),(16-19)(2,((2-4))). The posting list contains the following object references:

(1, (2-4), (10-12), (16-19)) This object reference refers to JSON object 1. The object reference maps field token "name" to regions in JSON object 1 defined by token ranges #2-#4, token range #10-#12, and token range #16-#19.

(2,((2-4))) This object reference refers to JSON object 2. The object reference maps a field node "name" to the region in JSON object 2 defined by token range #2-#4.

Key Word Index 402 also contains an entry for "Helen". Because the entry contains "keyword" in Type, the entry maps the token "Helen" as a word in a data node to the JSON objects and regions specified in posting list (1,(11, 17)) (2, (3)). This posting list contains object references as follows:

(1,(11, 17)) This object reference refers to JSON object 1. The object reference further maps the word "Helen" to two locations in JSON object 1 defined by token location #11 and #17.

(2, (3)) This object reference refers to JSON object 2. The object reference maps the word "Helen" to a location in JSON object 2 defined by token location #3.

Range Index

For types of data such as words, the domain of values has a smaller cardinality than other more "continuous" kinds of types of data, such as numeric or date/time types. Often, queries base selection criteria on an attribute holding continuous data. Range indexes may enable more efficient computation of range-based indexes. A range index indexes continuous data by ranges. The keys of a range index are ranges.

Date Range Index 404 (see FIG. 4) is an example of a range index. Date Range Index 404 is a table that indexes tokens corresponding to data nodes having date values. Such tokens are herein referred to as date value tokens. Date Range Index 404 includes column Range and column PostingList. Column Range contains date ranges and PostingList contains posting lists.

Each entry in Date Range Index 404 maps a respective range in column Range to instances of date value tokens that fall within the respective range, where the instances of the date value tokens are in locations within the JSON objects as specified by a posting list in column PostingList. A posting list in column PostingList comprises one or more object references to JSON objects, referred to herein as object-value references. An object-value reference contains an identifier that identifies a JSON object, a specific date value token, one or more token locations, as is illustrated below.

Date Range Index 404 contains an entry for 1990-01-01 to 2000-01-01. The entry maps this date range to JSON objects containing date value tokens that fall within the region of the JSON objects specified by posting list (1, (1996-09-10,14)) (1, (1998-09-09, 6)) (2, (1998-09-09,6)). This posting list contains object-value references as follows:

(1,(1996-09-10,14)) This object-value reference refers to JSON object 1. The object-value reference specifically maps date value token 1996-09-10 to token location #14.

(1, (1998-09-09, 6)) This object-value reference refers to JSON object 1. The object-value reference specifically maps date value token 1998-09-09 to token location #6.

(2, (1998-09-09,6)) This object-value reference refers to JSON object 2. The object-value reference specifically maps date value token 1998-09-09 to token location #6.

While an embodiment of the present invention has been illustrated using a range index that indexes ranges of data types, an embodiment of the present invention is not limited to ranges that index date data types.

In an embodiment, a data type indexed by a range index may also be indexed by a key word index in a counter-part string data type. For example, a range index may index numeric integer values. Integer values may also be indexed as string values in the Key Word Index 402. A range index indexes the numeric integer values as a binary integer type (e.g. an 8, 16, or 32 bit byte that represents the integer value). It may be more efficient to evaluate a criterion for integer values that is based on a range using a range index but more efficient to evaluate a criterion for integer values that requires equality using a key word index.

A key word index or range index may be implemented in a variety of ways; an embodiment of the present invention is not limited to a particular implementation. In an embodiment, a key word index or range index is implemented as a database table. A column containing key values, such as column Token and column Range, may be indexed by secondary indexes, such as b-tree indexes or bit map indexes. A column for storing a posting list may be stored in a LOB (Large Object) column.

Generating Hierarchy-Value Indexes.

A hierarchy-value index may be generated using a streaming-event parser. A streaming-event parser traverses a hierarchical data object and generates "parsing" events as nodes are encountered during traversal of a hierarchical data object, nodes such as a field node, element node, data node or the end of such nodes.

According to an embodiment of the present invention, parsing events correspond to a node, the beginning of a node, or the end of node in a hierarchical data object. Each such event may correspond to one or more tokens. As parsing events are produced, any tokens encountered are extracted and may be assigned token locations within the JSON object. The tokens extracted and token locations assigned are used to update a hierarchy-value index.

Referring to FIG. 5, FIG. 5 includes Parsing Event Table 500. Parsing Event Table 500 lists a stream of parsing events generated while parsing JSON object 1. The events trigger assignment of monotonically increasing token numbers to parsing events and any tokens extracted for the parsing events. Such parsing events are referred to herein as token parsing events. Each token parsing event is categorized as a non-leaf event or leaf event, depending on whether the token parsing event corresponds to a token for a non-leaf node or leaf node. The following table lists token parsing events generated for parsing JSON objects according to an embodiment. Other embodiments may generate a different set of token parsing events.

| Event | Event Type | Semantic |
|---|---|---|
| Begin Obj | Non-leaf | Encounter beginning of an object node |
| Begin Array | Non-leaf | Encounter beginning of an array node |
| Field | Non-leaf | Encounter field node |
| Date | Leaf | Encounter JSON value of date data type |
| String | Leaf | Encounter JSON value of string data type |
| End Array | Non-Leaf | Encounter end of array |
| End Object | Non-Leaf | Encounter end of object |
| End Field | Non-Leaf | Encounter end of field |

Each non-leaf event corresponds to a non-leaf node and occurs in tandem as a pair with another non-leaf event. The first encountered non-leaf event in a pair is a "begin event", which corresponds to the beginning of a location of a non-leaf node in a JSON object. The other event in the pair is an "end event", and corresponds to the end of the region. For a field node, the begin even is a Field event and the corresponding End Field event is an end event. For an object node, a Begin Obj event is the begin event and corresponding End Obj event is an end event. For an array node, the Begin Array event is a begin event and a corresponding End Array event is an end event.

As leaf events and begin events for non-leaf nodes are encountered, monotonically increasing token numbers are assigned to tokens encountered.

For non-leaf nodes, the token numbers assigned to an Beg Obj event represent the beginning of a token range. Begin events and corresponding end events may be tracked using a stack. When a begin event is encountered, it is pushed to the top of stack. When an end event is encountered, the begin event on the stack is removed and the last assigned token number is assigned as the end of a token range.

For leaf nodes, token parsing events involve extraction of a JSON value which may become one or more tokens. For non-string values, a token parsing event and the extracted token are assigned a token number. For string values, a token number is assigned to each word in sequence.

The above procedure for extracting tokens and assigning token positions may be illustrated with reference to Parsing Event Table 500 in FIG. 5, which lists token numbers assigned to tokens in JSON object 1 (see also FIG. 3). Each entry represents a token parsing event. For a given entry, the first column lists the token parsing event and token or tokens extracted by the event, if any. The second column lists a token position assigned to each token.

Token parsing event 501 is the first in the event stream and is assigned token number 1. No token is extracted. The corresponding end event is token parsing event 555. When eventually encountered during parsing, token parsing event 555 triggers assignment of the most previously assigned token, token number 21, as the ending of the token range for token parsing event 501.

The next parsing event is token parsing event 502. Token parsing event 502 and the extracted token string value "name" are assigned token number 2 as the beginning of a token range.

The next parsing event is token parsing event 503, a String Value event. Token parsing event 503 is assigned token numbers 3 and 4, because the value extracted for token parsing event 503 contains words "John" and "Smith". Token number 3 is assigned to "John" and token number 4 is assigned to "Smith".

Token parsing event 503, being a String Value event following a Field event, is an end event for token parsing event 502. The last token number assigned is assigned as the ending of the token range for token parsing event 502 and its extracted field token "name".

Once the token parsing events shown in Parsing Event Table 500 are generated, Key Word Index 402 is updated based on the tokens extracted and the token's corresponding parsing event type.

For example, token parsing event 502, representing a token for a field name, is used to update the entry in Key Word Index 402 for field "name". Token parsing event 503, representing tokens for an atom string value, is used to update the entry in Key Word Index 402 for key word tokens "John" and "Smith".

Text Searching Options for Indexing

In an embodiment, generating tokens and key words for indexing Key Word Index 402 is performed in a manner to support various special text searching capabilities.

In an embodiment, "stop words" may be ignored when generating tokens to index. Stop words are very common words that provide very little search selectivity, for example, words like "the", "and", and "to". No token or token number is generated for a stop word; no entry in Key Word Index 402 is created.

An embodiment may employ stemming. In stemming, a stem of a token word that is an inflected form of the stem is used as a key word in place of the token word. Thus, when a field's value is "driving home", "drive" is indexed to the token location of token "driving".

An embodiment may employ uppercase version. In uppercase conversion, an upper case version of a token word is used as a key word. Thus, when a field's value is "driving home", "DRIVING" is indexed to token location of token "driving" and "HOME" is indexed to the token location of "home".

Path-Based Statement Operators

A path expression is an expression comprising a sequence of "path steps" that identifies one or more nodes in a hierarchical data object based on hierarchical positions of the one or more nodes. The "path steps" may be delimited by a "/", ".", or another delimiter. Each path step may be a tag name specifying a path to a node within the hierarchical data object. XPath is a query language specifying a path language for path expressions. Another query language is SQL/JSON, being developed by Oracle Corporation in conjunction with others.

In SQL/JSON, an example of a path expression for JSON is "$.friends.name'. The step "name" specifies a node having the node name "name". The step "friends" specifies the node name of the parent node of node "name". The "$" specifies the context of the path expression, which by default is the current JSON object for which the path expression is being evaluated.

A path expression may also specify predicates or criteria for a step that a node should satisfy. For example, the following query $.friends.birthdate>TO_DATE('1998-09-09', 'YYYY-MM-DD')

specifies that node "birthdate" is greater than the date value '1998-09-09'.

Query languages that support hierarchical mark-up languages include path-based statement operators that are evaluated against hierarchical data objects based on path expressions. Such a query language may provide path-based statement operators that use, inter alia, three of the following types of path-based evaluation.

Path-Exists:

A path-exists evaluation determines whether a node identified by a path expression exists in a hierarchical data object. The JSON_EXISTS operator, supported by Oracle Corporation, is an example of a statement operator that may be used to perform path-exists evaluation on JSON objects, as illustrated by the following query language statement:

Q1: Select * from JTAB where JSON_EXISTS('$.friends.name' passing jobj)

Query Q1 specifies selection of JSON objects from table JTAB that have a node identified by the path expression "$.friends.name".

Value-in-Path

A value-in-path evaluation determines whether a value of a node includes a specified value; a path expression identifies the node, value, and/or conditions the specified value should meet, as illustrated by the following query.

```
Q2: Select * from JTAB
where JSON_EXISTS('$.friends.name?( @="Helen Yan")' passing jobj)
```

Query Q2 specifies selection of JSON objects from table JTAB that have a node that contains a value equal to the string value "Helen Yan".

Value-Range

A value-range evaluation determines whether a value of a node falls within a range. A path expression identifies the node and the range that the node's value should meet, as illustrated by the following query.

```
Q3: Select * from JTAB
   Where JSON_EXISTS('$.friends.birthdate> TO_DATE('1998-09-
09', 'YYYY-MM-DD'))' passing jobj)
```

Query Q3 specifies selection of JSON objects from table JTAB that have a node that contains a date value greater than '1998-09-09'.

DBMS Evaluation of Path-Based Operators

According to an embodiment of the present invention, a DBMS evaluates path-based statement operators referenced in database statements submitted to the DBMS. The DBMS uses a hierarchy-value index to evaluate the path-based statement operators. To describe how a DBMS uses the hierarchy-value index to evaluate a path-based query operator, it is useful to describe how a DBMS evaluates a database statement and statement operators contained therein.

To execute a query, a query optimizer of a DBMS may generate one or more different candidate execution plans for the query, which are evaluated by the query optimizer to determine which execution plan should be used to compute the query.

A query execution plan defines operations for computing a query. An execution plan may be represented by a directed graph of interlinked nodes, referred to herein as execution plan operators or plan operators, that each corresponds to an operation or function of the execution plan. The hierarchy of the graph (i.e., directed tree) represents the order in which the execution plan operations are performed and how data flows (e.g. rows) between each of the execution plan operations.

An execution plan operator may generate a set of rows as output. There are execution plan operators for performing operations such a table scan, sort-merge join, nested-loop join, or filter operation. For example, a table scan plan operator may scan rows in a database table and return the rows to a filter plan operator. The filter plan operator may filter rows that satisfy a predicate condition in a query that requires that a column have a certain value, returning rows that have the certain value in the column.

One type of execution plan operator performs index evaluation. Such plan operators are referred to herein as index plan operators. Index plan operators evaluate an index to return the identities of rows that satisfy criteria, such as a criterion that specifies that a column of a row holds a certain value specified for the column in a query predicate.

According to an embodiment, index plan operators are used to perform index evaluation using a hierarchy-value index to determine which nodes and hierarchical data objects satisfy criteria specified in path expressions. Such index plan operators are referred to herein as path-based index operators.

Index Evaluation of Path-Based Index Operators

Using a hierarchy-value index to perform index evaluation for path expressions may entail performing containment-based joins between posting lists of different tokens. A containment-based join is used to determine token location containment, i.e. whether a token location contains the token location of another token. Based on the object references of posting lists of different tokens, a containment-based join entails determining whether the object references of tokens are for the same hierarchical data object (based on object id) and that a token location in one object reference subsumes the token range of another object reference.

According to an embodiment of the present invention, index plan operators use a hierarchy-value index to perform containment-based joins to evaluate path expressions. For example, a containment-based join may be used to perform a path-exists evaluation for the following path P1:

P1: "$.friends.name"

To perform path-exists evaluation for the above, Key Word Index 402 is scanned to retrieve the posting list of each of the tag names in a path expression, the tag names being "friends" and "name". From these posting lists, it is determined that the posting list of "friends" includes an object reference (1,((7-21)) specifying a token location subsuming another token location in an object reference in the posting list for "name", (1, . . . ((10-12 . . . )).

Post-Containment Processing

A containment-based join operation using a hierarchy-value index may not be sufficient to complete a path-based evaluation. Additional forms of evaluation may be needed; such additional forms of evaluation are referred to herein as post-containment processing. Even though containment-joins may be insufficient to fully evaluate of path-based evaluation, containment-based join operations are nevertheless useful to efficiently filter and eliminate hierarchical data objects that do not satisfy a path expression, thereby forming a smaller filtered set of candidate hierarchical data objects. The smaller filtered set of candidate hierarchical objects may then be subjected to additional evaluation to complete the path-based evaluation. Index plan operators may perform both containment-based join operations and post-containment processing.

For example, in path P1 above, a containment-based join may determine that a "friends" node may contain node "name", but not that node "name" is a child of a node "friends", as specified in path P1. To fully perform a path-exists evaluation, the JSON object 1 may have to be further evaluated, by, for example, parsing JSON object 1.

Another example of post-containment processing is illustrated by path P2:

'$.name?($="John Smith")

Path P2 requests root nodes having a node name "name" that equals the string value "John Smith". Containment-based joins may be used to determine which field tokens "name" have a token location that contains both a key word token "John" and a key word token "Smith", but not which field tokens correspond to a field node that contains the full string value "John Smith". A reason for this is that Key Word Index 402 maps key words to tokens, but does not map complete string values containing more than one word to tokens. Nevertheless, containment-based joins in combination with post-containment processing may be used to fully evaluate path P2.

For example, containment-based joins may be initially performed to determine a set of key word tokens "John" and key word tokens "Smith" that are both contained by field tokens "name". Then the object references for this set are examined during a post-containment processing operation. The operation determines key word token pairs comprising a key word token "John" and token "Smith" that has the token number following the token number of the key word token "John" within the same hierarchical data object.

Path expressions may specify that a node occupy a particular array position. The array position cannot be determined solely by containment-based join operations. In this case, post-containment processing includes evaluation of a candidate hierarchical data object to determine array positions of nodes in an array.

Post-Containment Processing for Text Searching

Post-containment processing may be performed to support various special text searching capabilities, such as those mentioned earlier.

For an embodiment that uses uppercase conversion, a query predicate based on key words may be case sensitive. In this case, once a filtered set of candidate hierarchical data objects have been determined to contain a string value in a node specified by a path expression, the hierarchical data objects themselves are accessed and examined to determine whether case is matched.

For an embodiment that uses stemming, search criteria for a query predicate may require exacting matching to search terms. However, because of stemming, terms in search criteria must converted to stem form and a filtered set of candidate hierarchical data objects is formed based on the stem form. Post containment processing is then performed for exact matching. Such post-containment processing is illustrated by path P3:

'$.name?($="driving home")

Containment-based joins may be initially performed to determine a set of key word tokens "Drive" and key word tokens "home" that are both contained by field tokens "name". Then the object references for this set are examined during a post-containment processing operation. The operation determines key word token pairs comprising a key word token "driving" and token "home" that has the token number following the token number of the key word token "driving" within the same hierarchical data object.

As another example, for an embodiment that uses stop words, search criteria may require exacting matching to search terms. However, because of stop terms, an initial search is based on a set of key words that do not include stop words. Post containment processing is performed for exact matching with the stop words.

Use of Range Index

In an embodiment of the present invention, containment-based joins are based not only on token locations specified in object references, but also value tokens specified in the object references. Furthermore, a range index may be used to perform not only value-range evaluation but also value-in-path evaluation.

An example of value-range evaluation is provided by following path expression P3:

'$.friends.birthdate>TO_DATE('1998-09-09', 'YYYY-MM-DD')'

Date Range Index 404 is evaluated to find the entry associated with a key range that covers the date range '1998-09-09', and retrieve the posting list from the corresponding entry, which is (1,(1996-09-10,14)) (1, (1998-09-09, 6)) (2, (1998-09-09,6)). Then object references specifying token values within the specified range are selected from the posting list, which are (1, (1998-09-09, 6)) (2, (1998-09-09, 6)). Containment-based joins are then performed for field tokens "friends" and "birthdate". Post-containment processing may be performed to fully evaluate the conditions specified by the path expression P3. Note that if Date Range Index 404 had entries that indexed ranges beyond "1990-01-01 to 2000-01-01", the posting lists for these entries would be similarly evaluated.

An example of value-in-path evaluation is provided by following path expression P3:

'$.friends.birthdate=TO_DATE('1998-09-09', 'YYYY-MM-DD')'

Date Range Index 404 is used in a manner similar to that described above, except that object references specifying token values that match the predicate value are selected from the posting list, which are (1, (1998-09-09, 6)) (2, (1998-09-09,6)).

Combining Path Expressions

Queries may contain multiple path-based statement operators. The path expressions of each path-based statement operator may involve evaluating data nodes contained within the same nodes. An example of such a query is query Q4:

Q4:Select * from TAB
  Where JSON_EXISTS('$.friends.birthdate>TO_DATE('1998-01-01', 'YYYY-MM-DD'))' passing jobj) Or
  JSON_EXISTS('$.friends.birthdate<TO_DATE('1996-01-01', 'YYYY-MM-DD')') passing jobj)'

Both statement operators specify that data nodes reside under the same nodes identified by the path expression "$.friends.birthdate".

A query execution plan for evaluating Q4 may include a path-based index operator for each JSON-EXISTS statement operator. Each would generate rows that contain JSON objects that satisfy the respective path expression. The intersection of rows would contain the JSON objects that satisfy the predicate in Q4. However, in this approach both path-based index operators would evaluate the same set of containment-based joins for the same nodes. Another approach is to use a single path-based index operator to evaluate both path expressions. The set of containment-based joins would be evaluated once for the same nodes.

Database Systems

Embodiments of the present invention are used in the context of DBMS's. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use another terminology.

A database dictionary comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database statement may be in the form of a database statement that conforms to a syntax of a database language. One example language for expressing database statements is the SQL. DDL statements are issued to a DBMS to define database structures such as tables, views, or complex data types. For instance, CREATE, ALTER, DROP, and RENAME, are examples of DDL commands found in some SQL implementations. When DDL statements are issued to create a database object or to modify database object, the database dictionary is modified to define the database objects accordingly. DML commands are issued to a DBMS to manage data stored within a database structure. For instance, SELECT, INSERT, UPDATE, and DELETE are common examples of DML instructions found in some SQL implementations. SQL/XML and SQL/JSON are extensions of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

Storage of Hierarchical Data Objects

Various types of storage mechanisms are used to store hierarchical data objects, such as XML documents. One type of storage mechanism stores a hierarchical data object as a text file in a file system. As mentioned previously, another type of mechanism for storing hierarchical data objects is a DBMS. In a DBMS, a hierarchical data object may be stored in a row of a table and nodes of the hierarchical data object are stored in separate columns in the row. An entire hierarchical data object may also be stored in a lob (large object) in a column. A hierarchical data object may be shredded and stored as a hierarchy of objects in a database; each object is an instance of an object class and stores one or more elements of a hierarchical data object. Tables and/or objects of a database system that hold hierarchical data objects are referred to herein as base tables or objects.

Binary-token encoding is another form in which hierarchical data objects may be stored in a database. Binary-token encoding generates is a compact binary representation of a hierarchical data object that is designed to reduce the size of hierarchical data objects. One of the ways binary-token encoding encode hierarchical data objects is by representing strings with fixed values.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
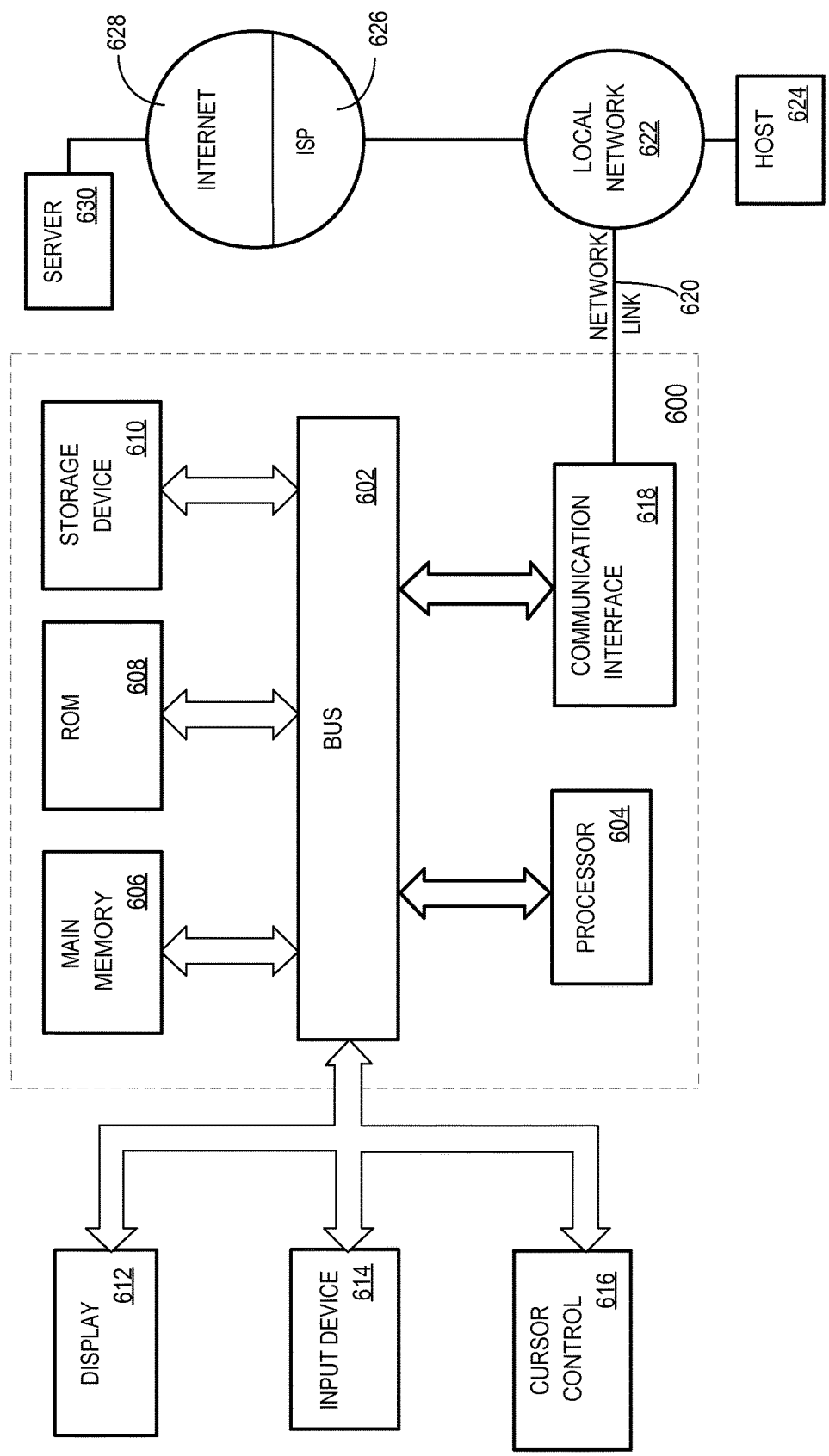
FIG. 6 illustrates a block diagram for a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electro-magnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
for a plurality of hierarchical data objects, generating a plurality of tokens by at least parsing each hierarchical data object of said plurality of hierarchical data objects, each token of said plurality of tokens being associated with a token location within a hierarchical data object of said plurality of tokens, wherein said plurality of tokens comprise:
non-leaf tokens that each correspond to a tag name node in said plurality of hierarchical data objects;
leaf tokens that each correspond to a value comprising a data node in a hierarchical data object of said plurality of hierarchical data objects;
wherein each token location of said non-leaf tokens contains a token location of a leaf token of said leaf tokens in a hierarchical data object of said plurality of hierarchical data objects;
generating a hierarchy-value index that indexes said plurality of tokens, said hierarchy-value index mapping each token of said plurality of a tokens to certain one or more token locations within certain one or more hierarchical data objects of said plurality of hierarchical data objects; and
wherein the method is performed by one or more computing devices.
2. The method of claim 1, further including evaluating a path expression based on said hierarchy-value index and token containment between said leaf tokens and said non-leaf tokens.

3. The method of claim 1,
wherein said non-leaf tokens comprise tag name tokens, each tag name token of said tag name tokens representing a tag name of a node within said plurality of hierarchical data objects;
wherein said leaf tokens comprise key word tokens, each key word token of said key word tokens representing a word in a data node within said plurality of hierarchical data objects; and
wherein generating a hierarchy-value index includes generating a first index that indexes said key word tokens and said at least a portion of said tag name tokens, said hierarchy-value index mapping each token of said key word tokens and said at least a portion of said tag name tokens to one or more token locations within one or more hierarchical data objects of said plurality of hierarchical data objects.

4. The method of claim 3, wherein:
said first index comprises first index entries; and
wherein for each particular token of said key word tokens and said at least a portion of said tag name tokens, an index entry of said first index entries maps said each particular token to one or more token locations within one or more respective hierarchical data objects.

5. The method of claim 4, wherein for each particular token of said key word tokens and said at least a portion of said tag name tokens, an index entry of said first index entries contains a posting listing comprising object references, each object reference of said object references identifying a certain hierarchical data object of said one or more respective hierarchical data objects and specifying certain one or more token locations within said certain hierarchical data object.

6. The method of claim 3,
wherein said leaf tokens comprise a plurality of value tokens, each value token of said plurality of value tokens representing a value of a data node within a plurality of hierarchical data objects; and
wherein generating a hierarchy-value index includes generating a second index that indexes value ranges of said plurality of value tokens, said second index mapping said value ranges to said value tokens and token locations within said plurality of hierarchical data objects of said value tokens.

7. The method of claim 6, wherein:
said second index comprises second index entries; and
wherein for each value range of said value ranges, an index entry of said second index entries contains said each value range and a posting listing comprising object references, each object reference of said object references identifying a certain hierarchical data object of said plurality of hierarchical data objects, a certain token value, and one or more token locations of said certain token value.

8. The method of claim 6, wherein evaluating a path expression based on said hierarchy-value index and token containment between said leaf tokens and said non-leaf tokens includes performing a value-range evaluation using said second index.

9. The method of claim 1, wherein generating a hierarchy-value index includes:
parsing a certain hierarchical data object of said plurality of hierarchical data objects thereby generating a plurality of parsing events which include a subset of parsing events;
for each particular parsing event of said subset of parsing events:
when said each particular parsing event represents a tag name, generating a tag name token and a token number for said tag name token that represents a beginning of a token range for said tag name token;
when said each particular parsing event represents a string value, for each word in said string value, establishing a word token and a token number for the word token; and
when said each particular parsing event represents an end of node for which a particular tag name token was generated, generating another token number that represents an ending of the token range of the particular tag name.

10. The method of claim 2, wherein evaluating a path expression includes:
performing containment-based joins based on token containment to partially evaluate said path expression against said plurality of hierarchical data objects; and
performing post-containment processing to complete evaluation of said path expression.

11. The method of claim 1, further including:
storing said plurality of hierarchical data objects in a column of a certain database table of a DBMS;
receiving a DDL statement requesting to create an index on said column;
in response to receiving said DDL statement:
creating said hierarchy-value index; and
modifying said hierarchy-value index in response to database statements specifying modification to said column.

12. The method of claim 11, wherein said hierarchy-value index includes a particular database table that includes:
a column that holds tokens; and
a binary object column that stores posting lists.

13. The method of claim 2, further including:
in response to a database statement that includes a path-based statement operator that contains said path expression:
generating an execution plan that includes a path-based index plan operator for evaluating said path-based statement operator; and
executing the execution plan including the path-based index plan operator, wherein executing the path-based index plan operator includes said evaluating said path expression.

14. The method of claim 2, wherein said path expression requires at least one of a path-exists evaluation, value-in-path evaluation, and a value-range evaluation.

15. The method of claim 1, wherein said plurality of hierarchical data objects conform to either JSON or XML.

16. One or more non-transitory storage media storing sequences of instructions which, when executed by one or more computing devices, cause:
for a plurality of hierarchical data objects, generating a plurality of tokens by at least parsing each hierarchical data object of said plurality of hierarchical data objects, each token of said plurality of tokens being associated with a token location within a hierarchical data object of said plurality of tokens, wherein said plurality of tokens comprise:
non-leaf tokens that each correspond to a tag name node in said plurality of hierarchical data objects;
leaf tokens that each correspond to a value comprising a data node in a hierarchical data object of said plurality of hierarchical data objects;
wherein each token location of said non-leaf tokens contains a token location of a leaf token of said leaf tokens in a hierarchical data object of said plurality of hierarchical data objects; and generating a hierarchy-value index that indexes said plurality of tokens, said hierarchy-value index mapping each token of said plurality of a tokens to certain one or more token locations within certain one or more hierarchical data objects of said plurality of hierarchical data objects.

17. The one or more non-transitory storage media of claim 16, wherein the sequences of instructions include instructions, that, when executed by said one or more computing devices, cause: evaluating a path expression based on said hierarchy-value index and token containment between said leaf tokens and said non-leaf tokens.

18. The one or more non-transitory storage media of claim 16,
wherein said non-leaf tokens comprise tag name tokens, each tag name token of said tag name tokens representing a tag name of a node within said plurality of hierarchical data objects; and
wherein said leaf tokens comprise key word tokens, each key word token of said key word tokens representing a word in a data node within said plurality of hierarchical data objects; and
wherein generating a hierarchy-value index includes generating a first index that indexes said key word tokens and said at least a portion of said tag name tokens, said hierarchy-value index mapping each token of said key word tokens and said at least a portion of said tag name tokens to one or more token locations within one or more hierarchical data objects of said plurality of hierarchical data objects.

19. The one or more non-transitory storage media of claim 18, wherein:
said first index comprises first index entries; and
wherein for each particular token of said key word tokens and said at least a portion of said tag name tokens, an index entry of said first index entries maps said each particular token to one or more token locations within one or more respective hierarchical data objects.

20. The one or more non-transitory storage media of claim 19, wherein for each particular token of said key word tokens and said at least a portion of said tag name tokens, an index entry of said first index entries contains a posting listing comprising object references, each object reference of said object references identifying a certain hierarchical data object of said one or more respective hierarchical data objects and specifying certain one or more token locations within said certain hierarchical data object.

21. The one or more non-transitory storage media of claim 18,
wherein said leaf tokens comprise a plurality of value tokens, each value token of said plurality of value tokens representing a value of a data node within a plurality of hierarchical data objects; and
wherein generating a hierarchy-value index includes generating a second index that indexes value ranges of said plurality of value tokens, said second index mapping said value ranges to said value tokens and token locations within said plurality of hierarchical data objects of said value tokens.

22. The one or more non-transitory storage media of claim 21, wherein:
said second index comprises second index entries; and
wherein for each value range of said value ranges, an index entry of said second index entries contains said each value range and a posting listing comprising object references, each object reference of said object references identifying a certain hierarchical data object of said plurality of hierarchical data objects, a certain token value, and one or more token locations of said certain token value.

23. The one or more non-transitory storage media of claim 21, wherein evaluating a path expression based on said hierarchy-value index and token containment between said leaf tokens and said non-leaf tokens includes performing a value-range evaluation using said second index.

24. The one or more non-transitory storage media of claim 16, wherein generating a hierarchy-value index includes:
parsing a certain hierarchical data object of said plurality of hierarchical data objects thereby generating a plurality of parsing events which include a subset of parsing events;
for each particular parsing event of said subset of parsing events:
when said each particular parsing event represents a tag name, generating a tag name token and a token number for said tag name token that represents a beginning of a token range for said tag name token;
when said each particular parsing event represents a string value, for each word in said string value, establishing a word token and a token number for the word token; and
when said each particular parsing event represents an end of node for which a particular tag name token was generated, generating another token number that represents an ending of the token range of the particular tag name.

25. The one or more non-transitory storage media of claim 17, wherein evaluating a path expression includes:
performing containment-based joins based on token containment to partially evaluate said path expression against said plurality of hierarchical data objects; and
performing post-containment processing to complete evaluation of said path expression.

26. The one or more non-transitory storage media of claim 16, wherein the sequences of instructions include instructions, that, when executed by said one or more computing devices, cause:
storing said plurality of hierarchical data objects in a column of a certain database table of a DBMS;
receiving a DDL statement requesting to create an index on said column;
in response to receiving said DDL statement:
creating said hierarchy-value index; and
modifying said hierarchy-value index in response to database statements specifying modification to said column.

27. The one or more non-transitory storage media of claim 26, wherein said hierarchy-value index includes a particular database table that includes:
a column that holds tokens; and
a binary object column that stores posting lists.

28. The one or more non-transitory storage media of claim 17, wherein the sequences of instructions include instructions, that, when executed by said one or more computing devices, cause:
in response to a database statement that includes a path-based statement operator that contains said path expression:
generating an execution plan that includes a path-based index plan operator for evaluating said path-based statement operator; and executing the execution plan including the path-based index plan operator, wherein executing the path-based index plan operator includes said evaluating said path expression.

29. The one or more non-transitory storage media of claim 17, wherein said path expression requires at least one of a path-exists evaluation, value-in-path evaluation, and a value-range evaluation.

30. The one or more non-transitory storage media of claim 16, wherein said plurality of hierarchical data objects conform to either JSON or XML.

* * * * *